(12) United States Patent
Morris

(10) Patent No.: US 8,363,996 B2
(45) Date of Patent: Jan. 29, 2013

(54) MOUNTING SYSTEM FOR TELECOMMUNICATIONS PANELS

(75) Inventor: Stephen James Morris, Cheltenham (GB)

(73) Assignee: ADC GmbH, Berlin (DE)

( * ) Notice: Subject to any disclaimer, the term of this patent is extended or adjusted under 35 U.S.C. 154(b) by 51 days.

(21) Appl. No.: 12/586,135

(22) Filed: Sep. 16, 2009

(65) Prior Publication Data

US 2010/0008059 A1  Jan. 14, 2010

Related U.S. Application Data

(62) Division of application No. 11/821,543, filed on Jun. 22, 2007, now Pat. No. 7,627,221.

(60) Provisional application No. 60/816,055, filed on Jun. 23, 2006, provisional application No. 60/816,093, filed on Jun. 23, 2006.

(51) Int. Cl.
*G02B 6/00* (2006.01)
*H05K 5/00* (2006.01)

(52) U.S. Cl. ......... 385/135; 385/136; 361/724; 361/730

(58) Field of Classification Search .......... 385/134–137; 361/724, 730
See application file for complete search history.

(56) References Cited

U.S. PATENT DOCUMENTS

| | | | |
|---|---|---|---|
| 4,840,568 A * | 6/1989 | Burroughs et al. | 439/49 |
| 5,129,842 A | 7/1992 | Morgan et al. | |
| 5,467,062 A | 11/1995 | Burroughs | |
| 5,685,741 A | 11/1997 | Dewey et al. | |
| 5,734,557 A * | 3/1998 | McAnally et al. | 361/727 |
| 6,241,562 B1 * | 6/2001 | Benda et al. | 439/731 |
| 6,480,391 B1 * | 11/2002 | Monson et al. | 361/752 |
| 7,054,163 B2 | 5/2006 | Coffey | |
| 7,070,457 B2 * | 7/2006 | Kluempke | 439/687 |
| 7,231,125 B2 | 6/2007 | Douglas et al. | |
| 7,280,352 B2 * | 10/2007 | Wilson et al. | 361/679.33 |
| 7,308,184 B2 | 12/2007 | Barnes et al. | |
| 7,400,813 B2 * | 7/2008 | Zimmel | 385/135 |
| 7,627,221 B2 | 12/2009 | Morris | |
| 2005/0122677 A1 | 6/2005 | Clark et al. | |

FOREIGN PATENT DOCUMENTS

| | | |
|---|---|---|
| EP | 1 478 056 A1 | 11/2004 |
| WO | WO 2004/086777 A1 | 10/2004 |
| WO | WO 2006/012389 A1 | 2/2006 |

OTHER PUBLICATIONS

Morris, U.S. Appl. No. 11/821,542, filed Jun. 22, 2007 *Latch and handle Arrangement for a Telecommunications Panel.*
International Search Report and Written Opinion mailed May 23, 2008.

* cited by examiner

*Primary Examiner* — Daniel Petkovsek
(74) *Attorney, Agent, or Firm* — Merchant & Gould P.C.

(57) ABSTRACT

A mounting arrangement for a telecommunications system, the system including a panel and a frame. The mounting arrangement providing a tool-less connection between the panel and the frame for ease of assembly and installation. In one embodiment, the mounting arrangement including flexible retaining clips provided on the panel, and guides formed on the frame. The flexible retaining clip and guides defining a snap-fit connection that is secure and easy to use.

5 Claims, 11 Drawing Sheets

MOUNTING SYSTEM FOR TELECOMMUNICATIONS PANELS

CROSS REFERENCE TO RELATED APPLICATIONS

This application is a divisional application of U.S. application Ser. No. 11/821,543, filed Jun. 22, 2007 (now U.S. Pat. No. 7,627,221, Issued Dec. 1, 2009); which claims the benefit of U.S. Provisional Application No. 60/816,055, filed Jun. 23, 2006, and U.S. Provisional Application No. 60/816,093, filed Jun. 23, 2006; which applications are incorporated herein by reference.

TECHNICAL FIELD

The present disclosure relates generally to devices for use in the telecommunications industry, and various methods associated with such devices. More particularly, this disclosure relates to mounting arrangements for telecommunications panels.

BACKGROUND

Telecommunications panels are used to provide electrical connections in a wide variety of telecommunication applications. The panels are often housed within and mounted to racks and cabinets, for example. Many racks and cabinets include frames having defined positions at which panels may be mounted. The panels are mounted at the defined panel positions with fasteners.

Each panel utilizes a minimum of two fasteners, and more often four fasteners, to secure the panel relative to the frame. On many frame systems, the fasteners include screws and corresponding captive cage nuts. Cage nuts are designed to provide a certain amount of float to ensure that manufacturing tolerances experienced with sheet metal frame constructions are accommodated. The cage nuts are often located within square holes in the frame.

The cage nuts are typically pre-installed within the square holes of the frame. Accordingly, cage nuts are often provided at empty panel positions on the frame. Providing cage nuts at each of the defined panel positions on the frame is time consuming and fiddly. In such conventional mounting arrangements, misalignment issues can also arise when attempting to match holes across the width of the frame.

In general, improvement has been sought with respect to such mounting systems, devices, and methods.

SUMMARY

The present disclosure relates to a mounting arrangement for mounting a telecommunications panel to a telecommunications frame. The mounting arrangement provides a toolless connection that secures the telecommunications panel to the telecommunications frame. A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
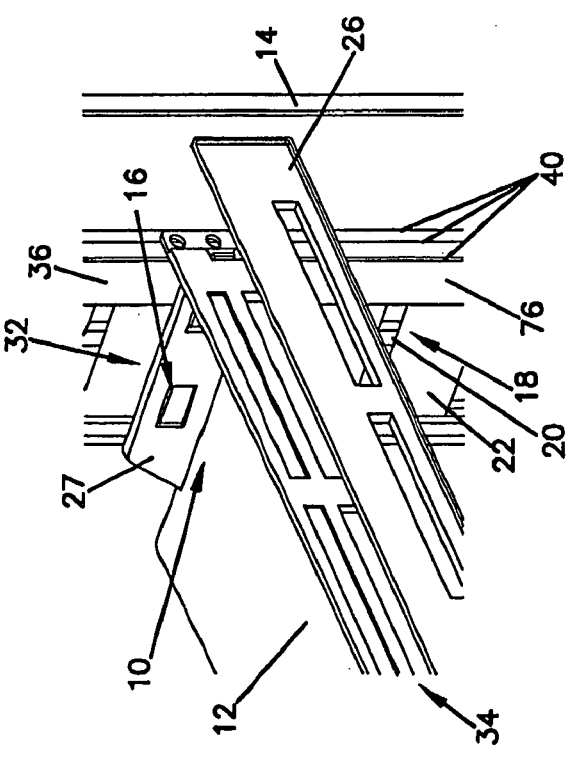
FIG. 1 is a left-side, front perspective view of one embodiment of a mounting arrangement for mounting a telecommunications panel to a frame, according to the principles of the present disclosure.

FIG. 1 illustrates a mounting arrangement 10 between a telecommunications panel 12 and a frame 14. The panel 12 in the illustrated embodiment is a patch panel, however, other types of panels and equipment can be provided with the present mounting arrangement in accordance with the principles disclosed. The frame 14 is that of a telecommunications rack. The features of the frame 14 can also be utilized in other systems and structures, such as cabinets and wall boxes, for example.

Figure 2:
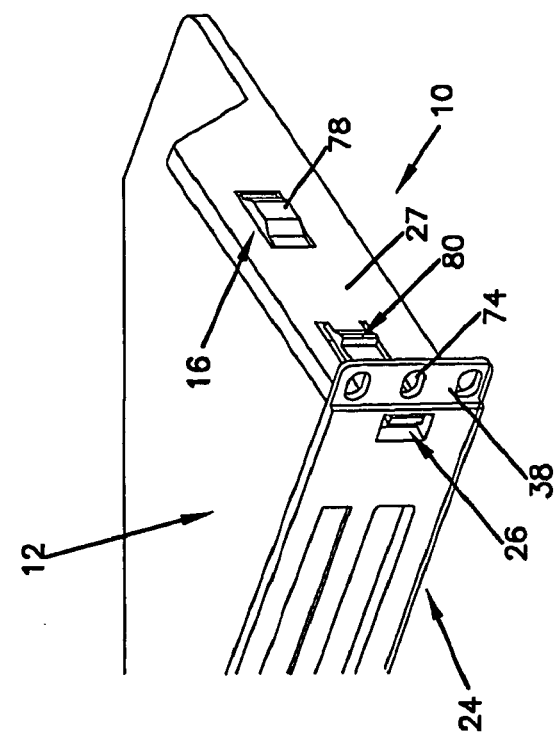
FIG. 2 is a right-side, front perspective view of the telecommunications panel shown in FIG. 1.

Referring now to FIGS. 1 and 2, the present mounting arrangement 10 generally provides a quick and easy-to-use connection 32 between the panel 12 and the frame 14. The connection 32 is configured to secure the panel 12 to the frame 14 without the use of tools. The connection 32 of the present mounting arrangement 10 further retains the panel 12 within a selected panel position 34 of the frame 14 without the use of additional mechanical fasteners, such as cage nuts and/or screws.

In the illustrated embodiment of FIGS. 1 and 2, the connection 32 is a snap-fit connection. That is, the mounting arrangement 10 of the present disclosure relies on flexible parts, on either the frame or panel, that deflect so that the panel can slide into a selected position of the frame. The flexible parts then return or snap back to a natural or non-deflected state to retain the panel 12 in a fixed location relative to the frame 14.

The flexible parts of the present mounting arrangement 10 generally include flexible retaining members (e.g., arms or clips) 16 provided on the panel 12. Guides 18 (FIG. 1) corresponding to the retaining clips 16 are provided on the frame 14. It is contemplated, that in the alternative, the flexible parts (i.e., the retaining clips) can be provided on the frame and the guides provided on the panel. (While only one side (e.g., 27) of the panel 12 and frame 14 are shown in the illustrated mounting arrangement 10, it is to be understood that each side of the panel and frame include identical mounting arrangement constructions.)

Referring to FIG. 2, the retaining clips 16 of the present mounting arrangement 10 are constructed to deflect as the panel 12 is inserted into a selected one of a number of panel position 34 defined by the frame 14. In particular, the retaining clips 16 are located on opposite sides 27 (only one shown) of the panel 12. The retaining clips 16 contact side frame members 36 of the frame 14 and deflect inward during initial panel insertion. As the panel 12 is further inserted, the retaining clips 16 each engage the corresponding guides 18 provided on the frame 14. When the panel 12 is fully inserted within the frame 14, the retaining members 16 snap back to a natural or non-deflected state within the guide 18.

In particular, in the illustrated embodiment of FIGS. 1 and 2, the guides 18 of the frame 14 include slots 20 formed within side members 22 of the frame 14. When the deflected retaining clips 16 engage the slots 20, the clips 16 snap back to the non-deflected state. When in the natural or non-deflected state, the retaining clips 16 extend through the slots 20 of the frame 14 and support the panel 12 at the selected panel position 34. The frame 14 typically includes a number of vertically-stacked panel positions; accordingly, corresponding guides 18 (e.g., slots 20) are provided along the length of the side members 22, i.e., from the bottom of the frame 14 to the top of the frame.

The retaining clips 16 can be formed integrally in the panel 12, or provided as a separate component carried by the panel. In the illustrated embodiment, the clips 16 are integrally formed from the sides 27 of the panel 12. The retaining clips 16 each include a detent or protrusion 78 that extend transversely outward from the side portion 26 of the panel 12. When the clips 16 seat within the slots 20 of the frame, the protrusions 78 function as stops to vertically support the panel 12 at the selected panel position 34. That is, the protrusions 78 extend through the slots 20 to retain the panel 12 at the selected panel position.

The snap-fit connection 32 of the present mounting arrangement 10 secures the panel 12 at the selected panel location yet reduces installation time by eliminating the need for installation tools and/or separate fasteners. The mounting arrangement 10 is thereby more time effective and easy to use by way of the pre-positioned guides or slots that replicate standard panel positioning.

In the illustrated embodiment, the mounting arrangement 10 further includes latch and handle arrangements 26 that lock the panel 12 into position relative to the frame 14. The arrangements 26 each include a latch arm 74 (FIG. 2). The latch arms 74 deflect while the panel 12 is being installed into the frame 14. Catches 80 formed on the latch arms 74 engage apertures 76 (e.g., a hole or slot; only one shown in FIG. 1) formed in the frame 14 when the panel 12 is fully inserted within the frame. The latch arms 74 are provided on the panel 12 and the apertures 76 are defined by the frame 14. In the alternative, the arms can be provided on the frame and the apertures defined by the panel. The arrangements 26 can further include handle portions (not shown) located adjacent to a front 24 of the panel 12. The handle portions can be used to release the latch arms 74 and remove the panel 12 from the frame 14. Additional details of latch and handle arrangements that can be used in the present mounting arrangement are described in U.S. patent application Ser. No. 11/821,542, published as Pub. No. 2008/0100069, which application is incorporated herein by reference.

As can be understood, the snap-fit connection 32 of the disclosed mounting arrangement 10 requires cooperation between structure of both the panel 12 and the frame 14. The present panel 12 however is configured for use in conventional frames. In particular, the retaining clips 16 of the panel 12 are located and flexibly constructed so that the clips deform when the panel 12 is mounted to a conventional frame. Further, the panel includes mounting brackets 38 that corresponding to the mounting configuration of conventional frames (not shown). The disclosed panel 12 can thereby be use in existing telecommunication racks, for example, until frame upgrades can be completed.

Likewise, the present frame 14 is configured to accept conventional panels. In particular, the guides 18 or slots 22 of the frame 14 are located and constructed to provide the snap-fit connection 32 with the present panel 12, but also are unobtrusive to therefore allow conventional panels to fit within the frame 12. Accordingly, the present frame 14 includes mounting holes 40 that correspond to the mounting configuration of conventional panels (not shown). The disclosed frame 14 can thereby be used with existing telecommunications panels, for example, until panel upgrades can be completed.

Figure 4:
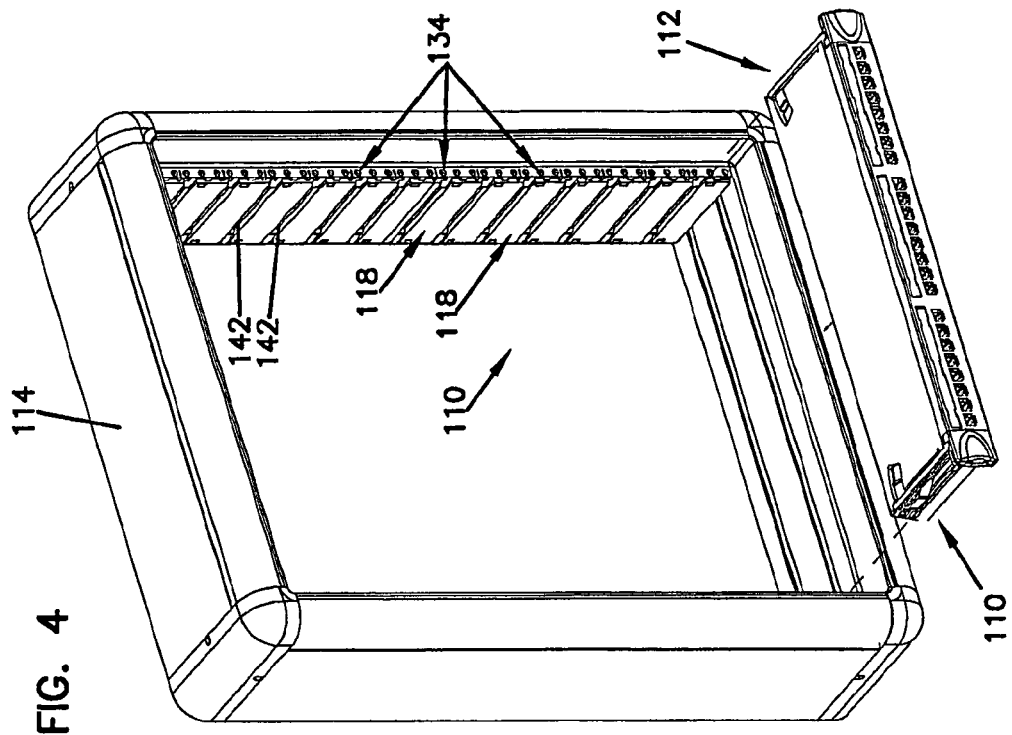
FIG. 4 is a front perspective view of the mounting arrangement of FIG. 3, showing the insertion of the telecommunications panel into the frame.
Figure 3:
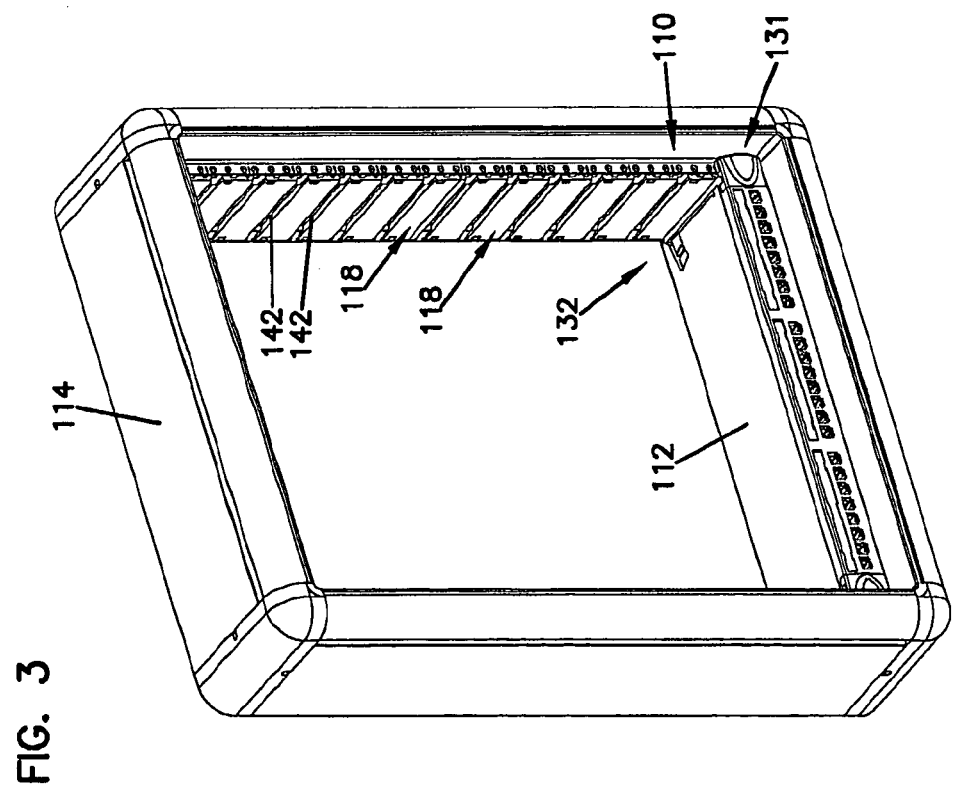
FIG. 3 is a front perspective view of another embodiment of a mounting arrangement for mounting a telecommunications panel to a frame, according to the principles of the present disclosure.
Figure 5:
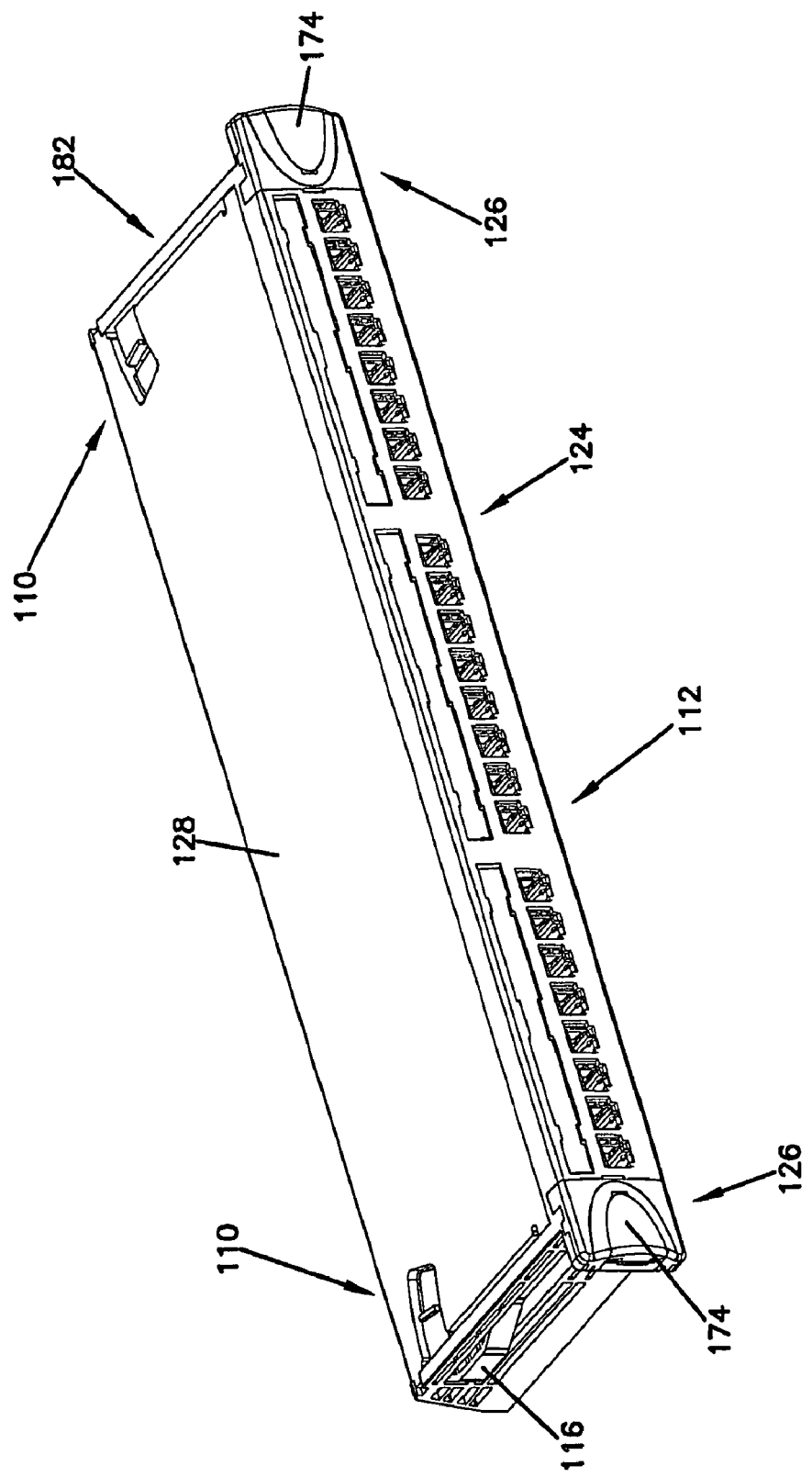
FIG. 5 is a front perspective view of the telecommunications panel illustrated in FIG. 3, and shown in isolation.

Referring now to FIGS. 3 and 4, another embodiment of a mounting arrangement 110 is illustrated. Similar to the previous embodiment, the mounting arrangement 110 provides a connection 132 between a panel 112 and a frame 114. The connection 132 is configured to secure the panel 112 to the frame 114 without the use of tools. The connection 132 of the mounting arrangement 110 further retains the panel 112 within a selected panel position (e.g., 134) of the frame without the use of addition mechanical fasteners, such as cage nuts and/or screws.

In the illustrated embodiment, the connection 132 is a snap-fit connection. That is, the mounting arrangement 110 relies on flexible parts, on either the frame or panel, that deflect so that the panel 112 can slide into a selected position of the frame 114. The flexible parts then return or snap back to a natural or non-deflected state to retain the panel 112 in a fixed location relative to the frame 114.

Referring now to FIG. 5-8, the flexible parts of the mounting arrangement 110 generally includes flexible retaining members 116 (e.g., arms or clips) provided on the panel 112. Guides 118 (FIG. 3) that correspond to the retaining clips 116 are provided on the frame 144.

Figure 8:
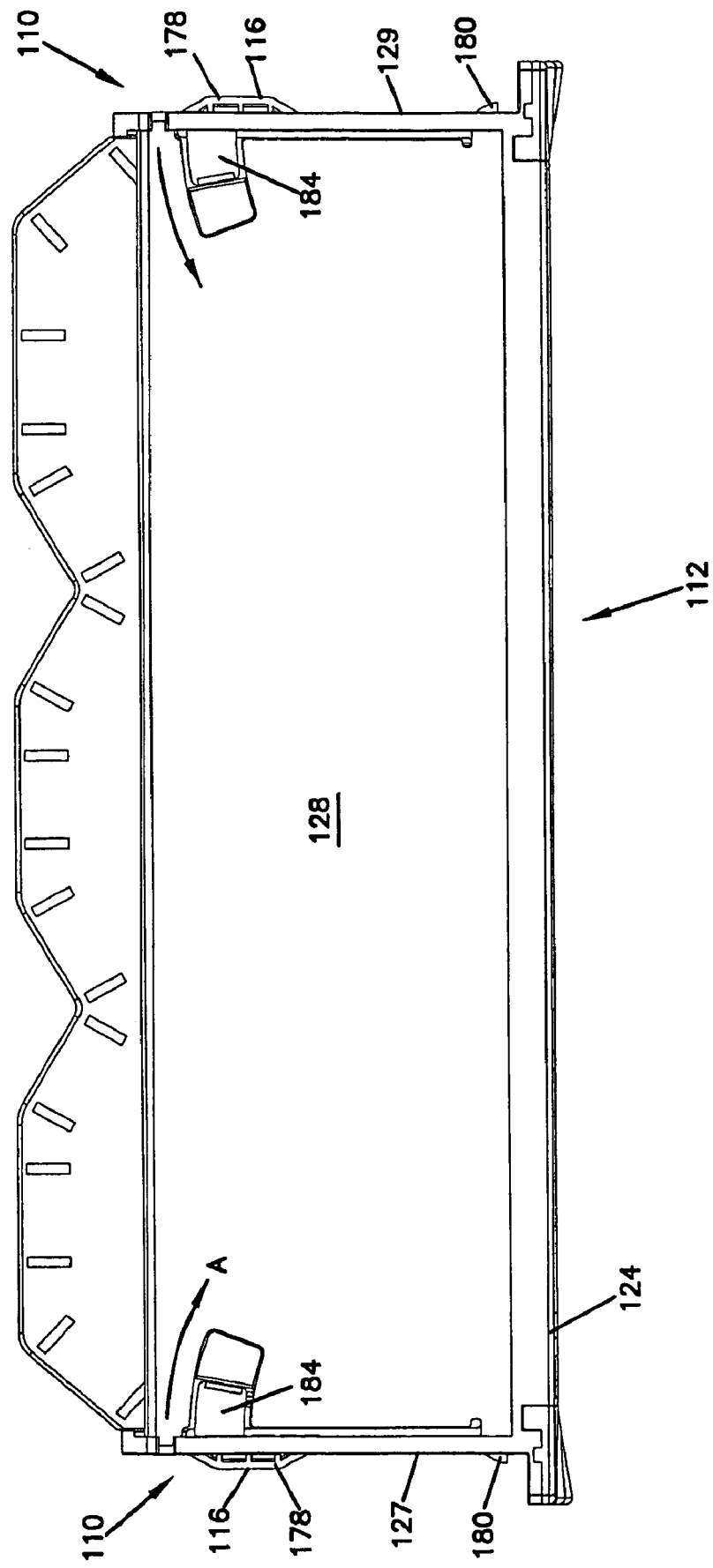
FIG. 8 is a top plan view of the telecommunications panel of FIG. 5.
Figure 9:
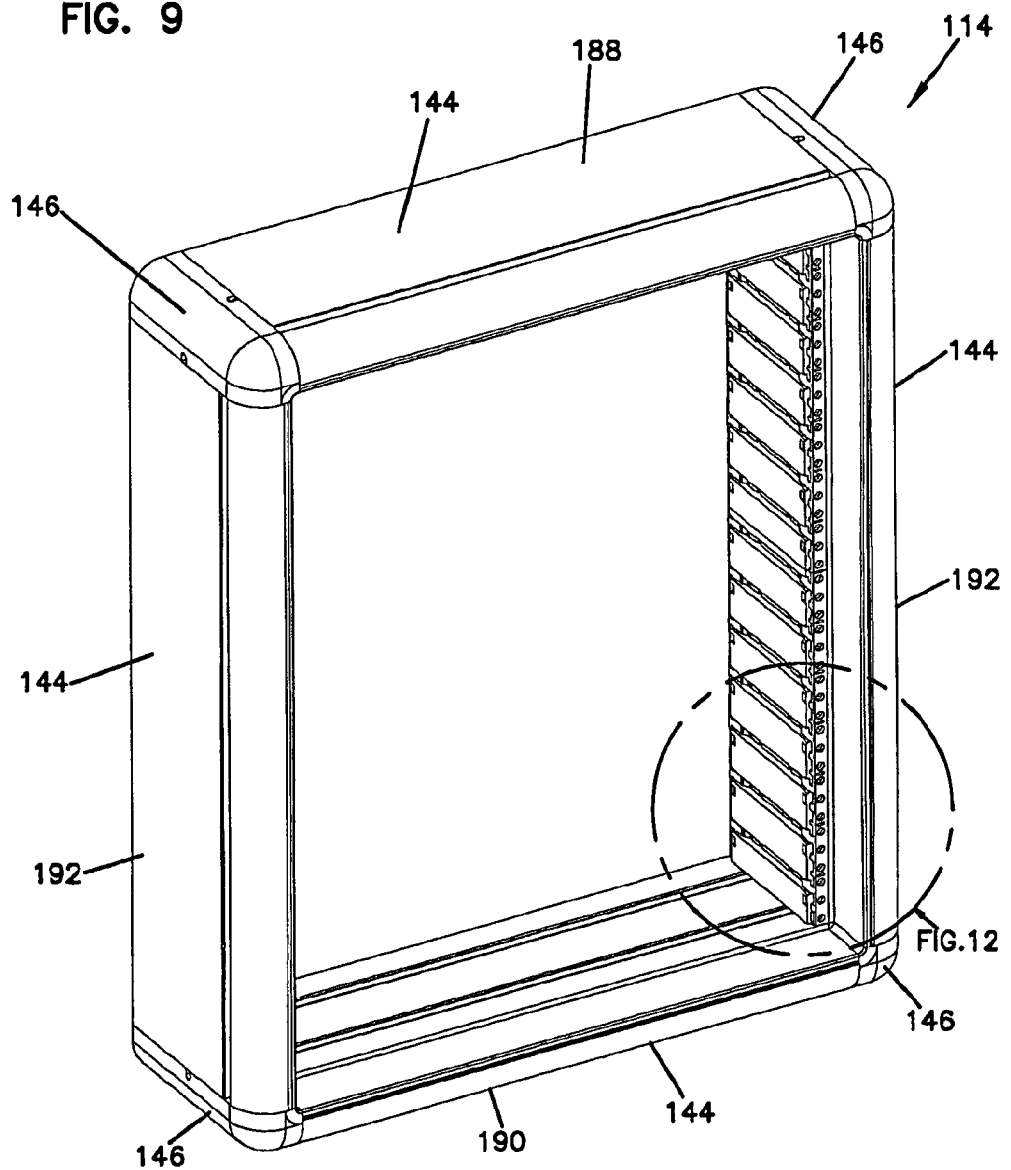
FIG. 9 is a front perspective view of the frame illustrated in FIG. 3, and shown in isolation.
Figure 10:
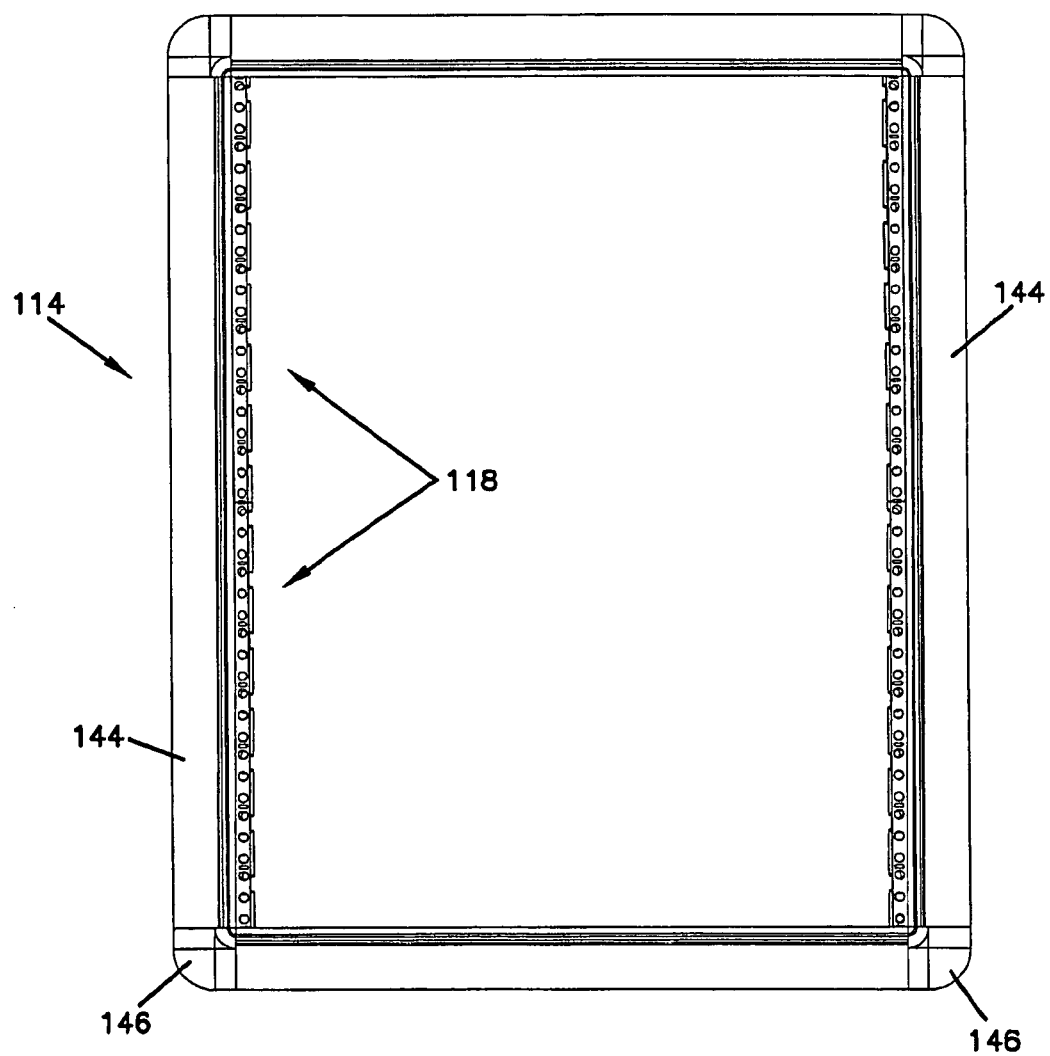
FIG. 10 is a front plan view of the frame of FIG. 9.

The retaining clips 116 of the present mounting arrangement 110 are constructed to deflect as the panel 112 is inserted into a selected one of a number of panel positions 134 (FIGS. 3 and 4) defined by the frame 114. The retaining clips 116 are located on opposite sides 127, 129 (FIG. 8) of the panel 112. Referring to FIG. 8, the clips 116 each include a protruding portion 178 that extends transversely beyond the opposite side 127, 129 of the panel. As will be discussed in greater detail hereinafter, the clips 116 contact the frame and deflect inward when the panel 112 is initially inserted into the frame 114. As the panel 112 is further inserted, the retaining clips 116 each engage a recess or seat 142 (FIG. 4) provided by the guides 118 of the frame 114. When the panel 112 is fully inserted within the frame 114, the retaining members 116 snap back to the natural or non-deflected state within the seat 142. When in the non-deflected state, the retaining clips 116 rest within the seat 142 and support the panel 112 at the selected panel position 134. The frame 114 typically includes a number of vertically-stacked panel positions; accordingly, corresponding guides 118 are provided from the bottom of the frame 114 to the top of the frame.

As shown in FIG. 8, when in the natural or non-deflected state, the clips 116 extend outward from the panel 112 so that the clips seat within the guides 118 (FIG. 4) and vertically support the panel 112 at the selected panel position. The retaining clips 116 can be formed integrally in the panel 112, or provided as a separate component carried by the panel 112. In this embodiment, the flexible retaining clips 116 are integrally provided on a cover piece 128 (FIG. 6) of the patch panel 112. The cover piece 128 encloses the interior of the panel.

Figure 6:
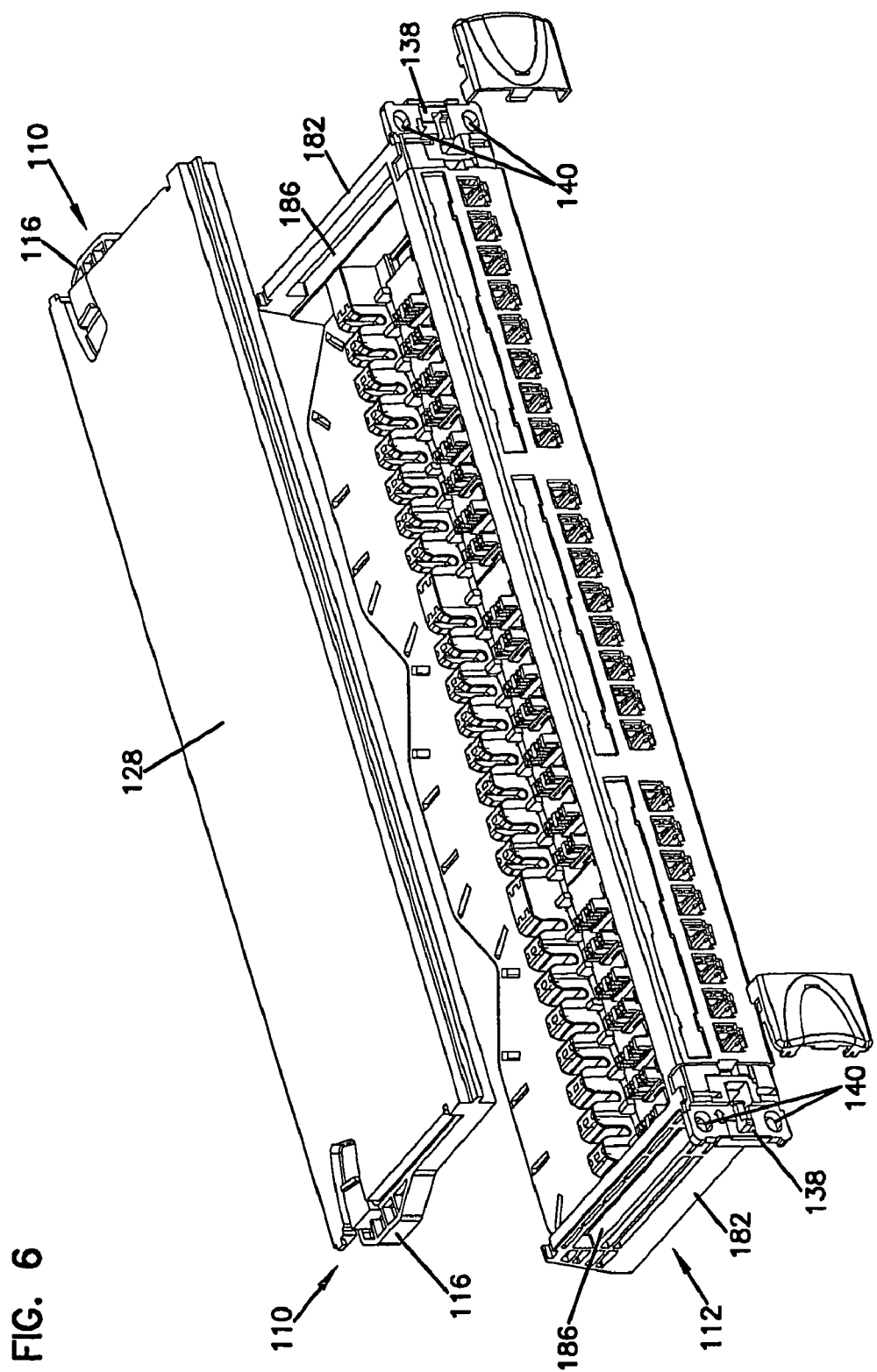
FIG. 6 is an exploded perspective view of the telecommunications panel of FIG. 5.
Figure 7:
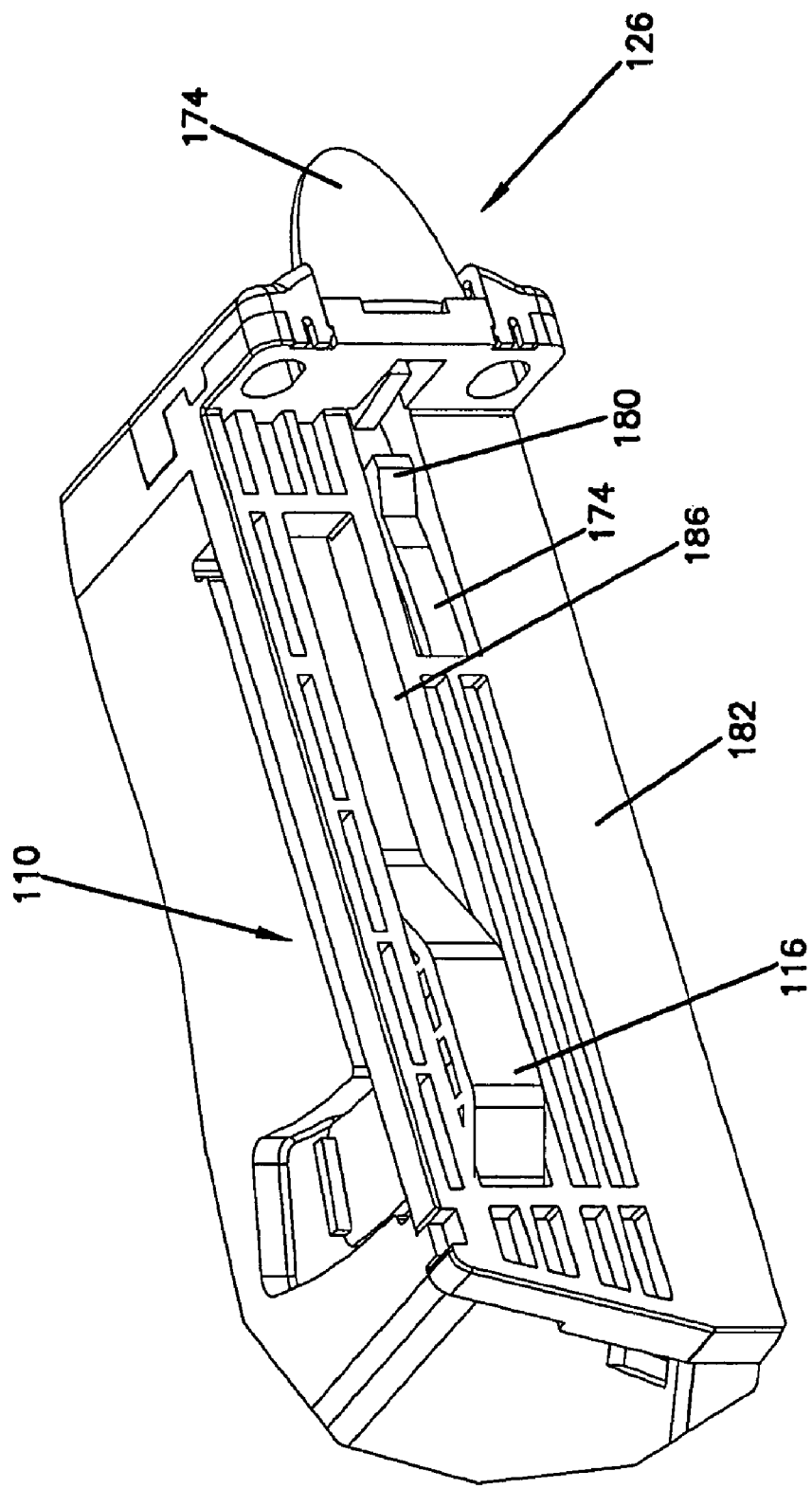
FIG. 7 is a partial side perspective view of the telecommunications panel of FIG. 5.

Referring to FIGS. 6 and 7, the clips 116 of this embodiment also function to secure the cover 128 in relation to a chassis 182 of the panel 112. In particular, the clips 116 extend through slots 186 formed in the chassis 182. To remove the cover 128 from the chassis 182, the clips 116 are flexed inward as shown by arrows A in FIG. 8. Flexing the clips 116 inward disengages the clips 116 from the slots 186 of the chassis 182 so that the cover 128 can be removed. Gripping tabs 184 are provided to aid in flexing the clips 116 inward.

Figure 11:
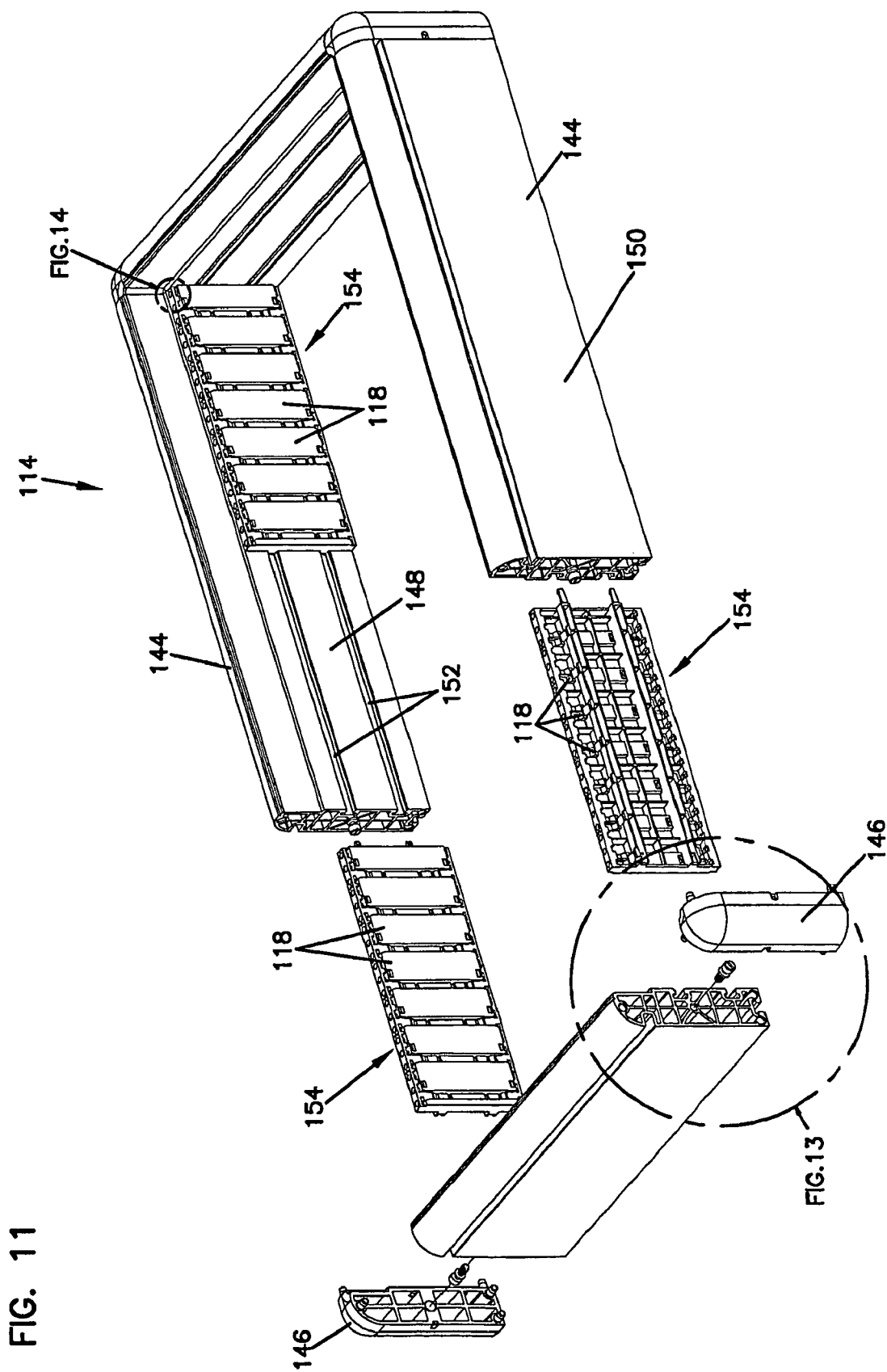
FIG. 11 is an exploded perspective view of the frame of FIG. 9.
Figure 12:
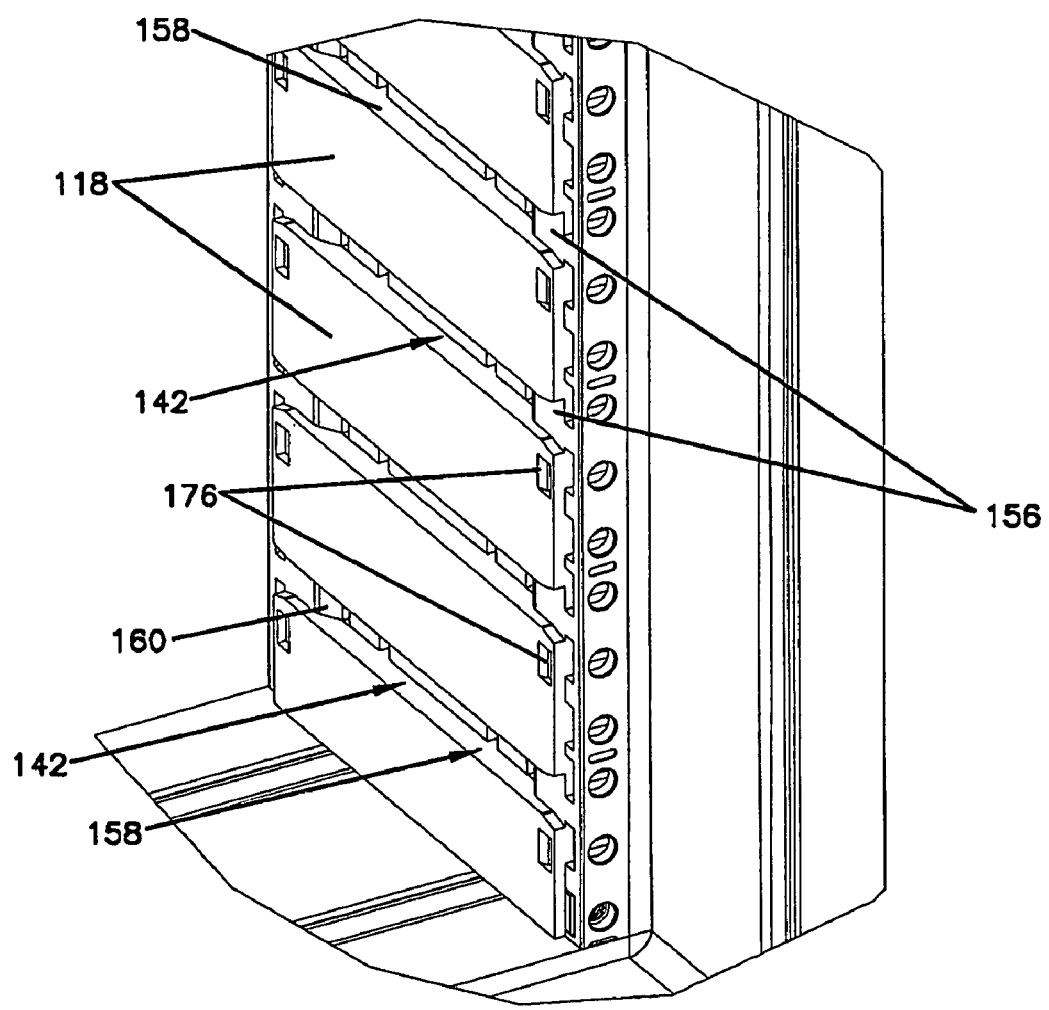
FIG. 12 is an enlarged detail view of a portion of the frame of FIG. 9.
Figure 14:
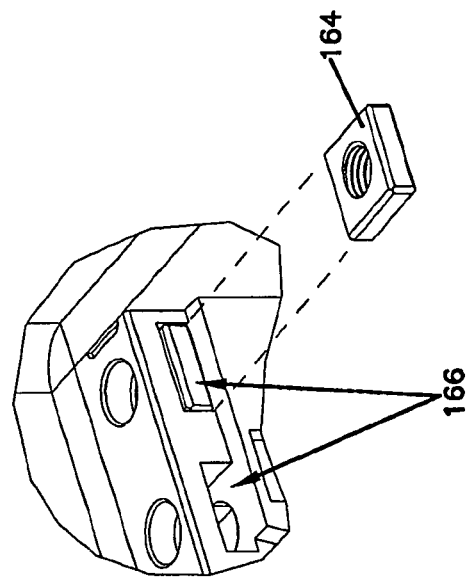
FIG. 14 is an enlarged detail view of another portion of the frame of FIG. 11.
Figure 13:
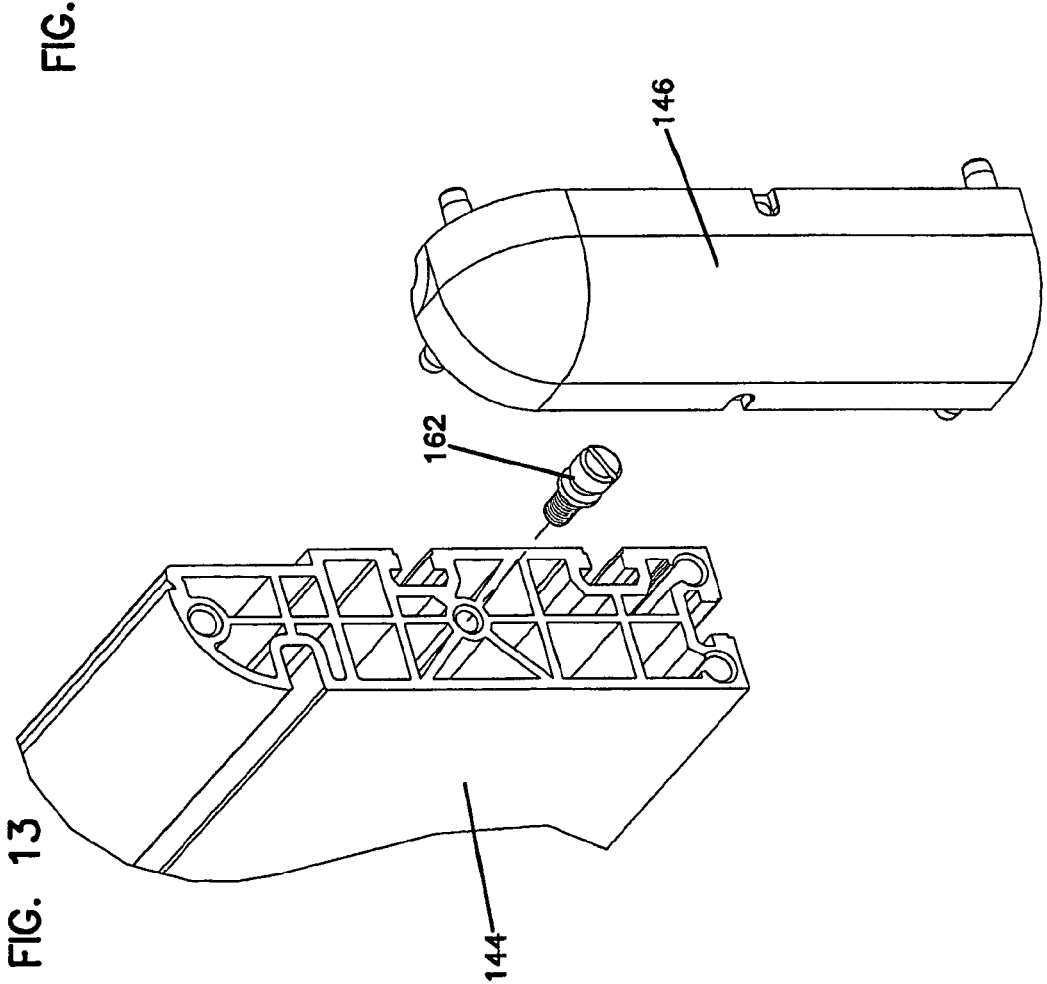
FIG. 13 is an enlarged detail view of a portion of the frame of FIG. 11.

Referring now to FIGS. 9-14, the illustrated frame 114 of this mounting arrangement 110 generally includes a plurality of elongated profile or frame members 144, including a top frame member 188 (FIG. 9), a bottom frame member 190, and side frame members 192. In the illustrated embodiment, the elongated frame members 144 are extrusions. The frame members 144 are interconnected to one another by corner pieces 146. As shown in FIGS. 11 and 13, fasteners 162 are used to secure the corner pieces 146 and the elongated frame members 144 together.

The frame members 144 have an interior side 148 (FIG. 11) and an exterior side 150. Channels 152 are formed in the interior side 148 of the elongated frame members 144. The channels 152 are configured to receive guides inserts 154. A number of guide inserts 154 can be interconnected and engaged with the channels 152 of the frame members 144.

The guide inserts 154 generally define the guides 118, which in turn define the mounting locations for a plurality of panels (e.g., 112; only one shown for clarity). When a panel 112 is initially inserted into one of the mounting locations, the retaining clips 116 of the panel 112 contact right and left deflecting structures or surfaces 156 (FIG. 12) that deflect the clips 116 inward. As the panel 112 slides further rearward, the retaining clips encounter the seat 142 defined by the guides 118. Each retaining clip then snaps back into the non-deflected state and rests upon a horizontal ledge surface 158 of the seat 142. The panel 112 is thereby vertically supported at the selected mounting location. A rearward stop surface 160 and the deflecting surface 156 aid in capturing the retaining clip 116 within the seat 142.

As previously discussed, the snap-fit connection 132 permits assembly of the system (i.e., attachment of the panels 112 to the frame 114) without the use of tools, and without the use of additional fasteners. Yet, the guide inserts 154 of the present frame 144 also accommodate conventional panels by providing structure that accepts captive cage nuts 164. In particular, the guide inserts 154 define pockets or slots 166 (FIG. 14) in which cage nuts 164 can be placed. Conventional panels can thereby be secured within the disclosed frame 114 until panel upgrades can be completes. Likewise, and referring back to FIG. 6, the disclosed panel 112 includes mounting brackets 138 with mounting holes 140 that correspond to the mounting configuration of conventional frames. The disclosed panel 112 can thereby be used in existing telecommunications racks, for example, until frame upgrades can be completed. When inserted within a conventional frame, the retaining clips 116 of the panel 112 simply deflect inward, and remain deflected inward when mounted.

Referring again to FIGS. 5 and 7, the panel 112 further includes latch and handle arrangements 126 that lock the panel 112 into position relative to the frame. The arrangements 126 each include a latch arm 174 (FIG. 7). The latch arms 174 deflect while the panel 112 is being installed into the frame 114. Catches 180 (see also FIG. 8) formed on the latch arms 174 engage apertures 176 (e.g., holes or slots) (FIG. 12) provided on the frame 114 when the panel 112 is fully inserted within the frame. In this embodiment, the latch arms 174 are provided on the panel 112 and the apertures 176 are defined by the frame 114. As previously described, in the alternative, the arms can be provided on the frame and the apertures defined by the panel. The latch and handle arrangements 126 further include handle portions 172 located at a front 124 of the panel 112. The handle portions 172 are used to release the latch arms 174 and remove the panel 112 from the frame 114. Further details of latch and handle arrangements that can be used in the present mounting arrangement are described in U.S. patent application Ser. No. 11/821,542, published as Pub. No. 2008/0100069, which application is previously incorporated herein by reference.

In general, the snap-fit connection 132 of the present mounting arrangement 110 secures the panel 112 at a selected panel location yet reduces installation time by eliminating the need for installation tools or separate fasteners. The mounting arrangement 110 is thereby more time effective and easy to use by way of the pre-positioned guide inserts 154 that replicate standard panel positioning.

The above specification provides a complete description of the present invention. Since many embodiments of the invention can be made without departing from the spirit and scope of the invention, certain aspects of the invention reside in the claims hereinafter appended.

What is claimed is:

1. A telecommunications panel, comprising:
 a) a panel chassis having a front, a rear, and opposing sides, the chassis defining a panel interior; and
 b) flexible arms located at opposing sides of the panel chassis, the flexible arms being arranged to deflect in a direction toward the panel interior and at least partially into the panel interior, the flexible arms each including a protruding portion that extends transversely beyond the sides of the panel when the flexible arm is in a non-deflected state; and
 (c) a cover secured to the panel chassis to enclose the panel interior;
 wherein the flexible arms are carried by the cover and attach the cover to the panel chassis.

2. The panel of claim 1, further including mounting brackets having a mounting hole configuration.

3. The telecommunications panel of claim 1, wherein the flexible arms provide a snap-fit connection to a telecommunications frame, thereby retaining the telecommunications panel within the telecommunications frame.

4. The telecommunications panel of claim 1, wherein the flexible arms are integrally formed with the cover.

5. The telecommunications panel of claim 1, wherein the flexible arms protrude through the sides when in a non-deflected state.

* * * * *